(12) United States Patent
Kinoshita et al.

(10) Patent No.: US 6,219,583 B1
(45) Date of Patent: *Apr. 17, 2001

(54) CONTROL SYSTEM

(75) Inventors: Jiro Kinoshita; Yoshiyuki Kubo, both of Minamitsuru-gun (JP)

(73) Assignee: Fanuc Limited, Yamanashi (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/564,218
(22) PCT Filed: Mar. 31, 1995
(86) PCT No.: PCT/JP95/00637
  § 371 Date: Dec. 15, 1995
  § 102(e) Date: Dec. 15, 1995
(87) PCT Pub. No.: WO95/29432
  PCT Pub. Date: Feb. 11, 1995

(30) Foreign Application Priority Data

Apr. 25, 1994 (JP) .................................... 6-086331

(51) Int. Cl.⁷ ................................................ G05B 19/18
(52) U.S. Cl. .......................................................... 700/3
(58) Field of Search .............................. 395/200.07, 842, 395/99; 364/242.31, 242.3; 709/212, 213–216, 217–219; 710/22, 23, 26; 700/264, 3

(56) References Cited

U.S. PATENT DOCUMENTS

| 3,882,305 | 5/1975 | Johnstone | 702/183 |
| 4,228,495 | * 10/1980 | Bernhard | 364/200 |
| 4,298,928 | * 11/1981 | Etoh | 364/200 |

(List continued on next page.)

FOREIGN PATENT DOCUMENTS

| 0 380 684 | 8/1990 | (EP) | G05B/23/02 |
| 0 387 359 | 9/1990 | (EP) | G05B/19/405 |
| 0410314A2 | * 1/1991 | (EP) | G06F/13/12 |
| 2-18105 | 2/1990 | (JP) . | |
| 3-144707 | 6/1991 | (JP) . | |
| 4-288603 | 10/1992 | (JP) . | |

OTHER PUBLICATIONS

Abstract and Front Page of WO 92/02870 A1 (Ikeda et al.), Feb. 1992.*
Patent Abstracts of Japan, vol. 008, No. 278 (p–322), Dec. 19, 1984 & JP 59–144901 a (Nissan Jidosha KK), Aug. 20, 1984.
Patent Abstracts of Japan, vol. 008, No. 141 (p–283), Jun. 30, 1984 & JP 59–041012 A (Hitachi Seisakausho KK), Mar. 7, 1984.
Patent Abstracts of Japan, vol. 010, No. 294 (p–504), Oct. 7, 1986 & JP 61–112204 A (Mitsubishi Electric Corp), May 30, 1986.

*Primary Examiner*—Mark R. Powell
(74) *Attorney, Agent, or Firm*—Staas & Halsey LLP

(57) ABSTRACT

Interactive data processing unit which is located at a distance from an FA control unit and capable of direct access to a memory in the FA control unit. When an access request to a memory (3) in a CNC (30) is issued by a device in an MMC (20), a remote access control means (1) outputs the access request to the CNC (30). Upon reception of the access request, an internal data input/output means (2) in the CNC (30) makes access to the requested address by performing a direct memory access (DMA) operation to the memory (3). It writes the data into the memory when the access request is a write-request. On the other hand, when the access request is a read-request, the internal data input/output means (2) outputs the data to the MMC (20). The remote access control means (1) in the MMC (20) receives the data and forwards it to the device which issued the access request. The MMC (20) thereby makes access directly to the memory (3) in the CNC (30).

9 Claims, 7 Drawing Sheets

U.S. PATENT DOCUMENTS

| | | | | |
|---|---|---|---|---|
| 4,368,511 | * | 1/1983 | Imazeki | 364/167 |
| 4,393,500 | * | 7/1983 | Imazeki | 371/13 |
| 4,396,973 | * | 8/1983 | Imazeki | 364/136 |
| 4,517,663 | * | 5/1985 | Imazeki | 365/222 |
| 4,587,607 | * | 5/1986 | Kurakake | 364/167 |
| 4,616,307 | * | 10/1986 | Kusumi | 364/147 |
| 4,628,442 | * | 12/1986 | Isobe | 364/900 |
| 4,994,957 | * | 2/1991 | Komiya | 364/147 |
| 5,027,225 | * | 6/1991 | Kurihara | 358/448 |
| 5,148,371 | * | 9/1992 | Kurakake | 364/474.01 |
| 5,452,420 | * | 9/1995 | Engdahl et al. | 710/105 |
| 5,485,552 | * | 1/1996 | Mizuno et al. | 700/264 |
| 5,598,575 | * | 1/1997 | Dent | 395/800 |

* cited by examiner

CONTROL SYSTEM

TECHNICAL FIELD

The present invention relates to a control system which consists of a factory automation (FA) control unit and an interactive data processing unit for interactively performing data input/output operations, and more specifically, to a control system which allows an improved access from the interactive data processing unit to a memory in the FA control unit.

BACKGROUND ART

Numerical control systems are equipped with a numerical controller (CNC) and a man-machine interface controller (MMC)M which interactively performs data input/output operations and processes the data. The man-machine interface controller has some peripherals such as input devices (e.g., keyboard and mouse) and a display device (e.g., CRT or liquid crystal display) for this interactive operations.

In many cases, the numerical controller and man-machine interface controller are installed in a common cabinet and connected with each other by a parallel bus. Thanks to this parallel bus connection, a high-speed data transfer is provided between the numerical controller and man-machine interface controller. However, it is impossible to locate the man-machine interface controller at a distance from the numerical controller because of difficulty in extending the parallel bus. If there was no such a restriction with the location of the man-machine interface controller, it would be possible to place the man-machine interface controller anywhere the machine operator would feel convenient for efficiency of his/her work. For this reason, there has been a demand that the man-machine interface controller and the numerical controller be connected by a long transmission line.

One traditional solution for the above demand is a system that interconnects the buses of the two controllers via an RS-232-C line, which is one of the data communications methods standardized by the Electronic Industry Association (EIA) in the United States of America. According to this system configuration, the man-machine interface controller can be located tens of meters away from the numerical controller, and both processors can exchange data using a predetermined software protocol.

For example, when the man-machine interface controller is about to make access to some memory data in the numerical controller, the man-machine interface controller first outputs a data transfer request to the numerical controller via the RS-232-C interface. Upon reception of the data transfer request, the numerical controller parses the request and sends the requested data in its memory back to the man-machine interface controller, thereby allowing the man-machine interface controller to get its desired data.

The above-described connection by the RS-232-C interface, however, always takes two steps when the man-machine interface controller tries to read memory data in the numerical controller. First, the man-machine interface controller issues a data transfer request, and second, the processor in the numerical controller must support actual data transfer operations. In other words, the man-machine interface controller cannot directly access the memory within the numerical controller. As a result, the man-machine interface controller in need of some data in the numerical controller, must wait for the numerical controller sending the data, thus spending significant time to obtain the data. Also, the processor in the numerical controller must take care of the data transfer for the man-machine interface controller in addition to its regular duty, namely, numerical control. This extra burden of the processor could degrade its processing performance in various areas.

As described above, when the man-machine interface controller and the numerical controller are set apart from each other, the conventional numerical control system slows down in its data processing operations. This is due to a lack of direct access capability from the man-machine interface controller to the numerical controller's memory.

SUMMARY OF THE INVENTION

An object of the present invention is to provide a control system where an interactive data processing unit located away from an FA control unit can make direct access to the memory in the FA control unit.

To accomplish the above objective, according to the present invention, there is provided a control system which comprising of an FA control unit and an interactive data processing unit for interactively performing data input/output operations. The present invention comprises a remote access control unit, provided in the interactive data processing unit, for transmitting access requests via a transmission line and receiving data coming from the transmission line. Via this configuration, an access request to an arbitrary address of memory in the FA control unit is made by the present invention. An internal data input/output unit, provided in the FA control unit, used in making a direct access to the memory in response to the access request input via the transmission line, writes write-data into memory, and transmits read-data read out from the memory to the transmission line.

The remote access control unit is provided in the interactive data processing unit and transmits an access request via a transmission line and receives data through the same. This access request is for data stored at an arbitrary memory address in the FA control unit.

An internal data input/output unit is provided in the FA control unit which directly access in order to write or read to memory in response to the access request input via the transmission line. It writes the given write-data into the memory when the access is a write-request, while it transmits the read-data to the transmission line when the access request is a read-request.

In this way the interactive data processing unit can make access directly to the memory in the FA control unit without any intervention by the processor in the FA control unit.

DESCRIPTION OF THE PREFERRED EMBODIMENT

An embodiment of the present invention will be described below with reference to the drawings.

Figure 1:
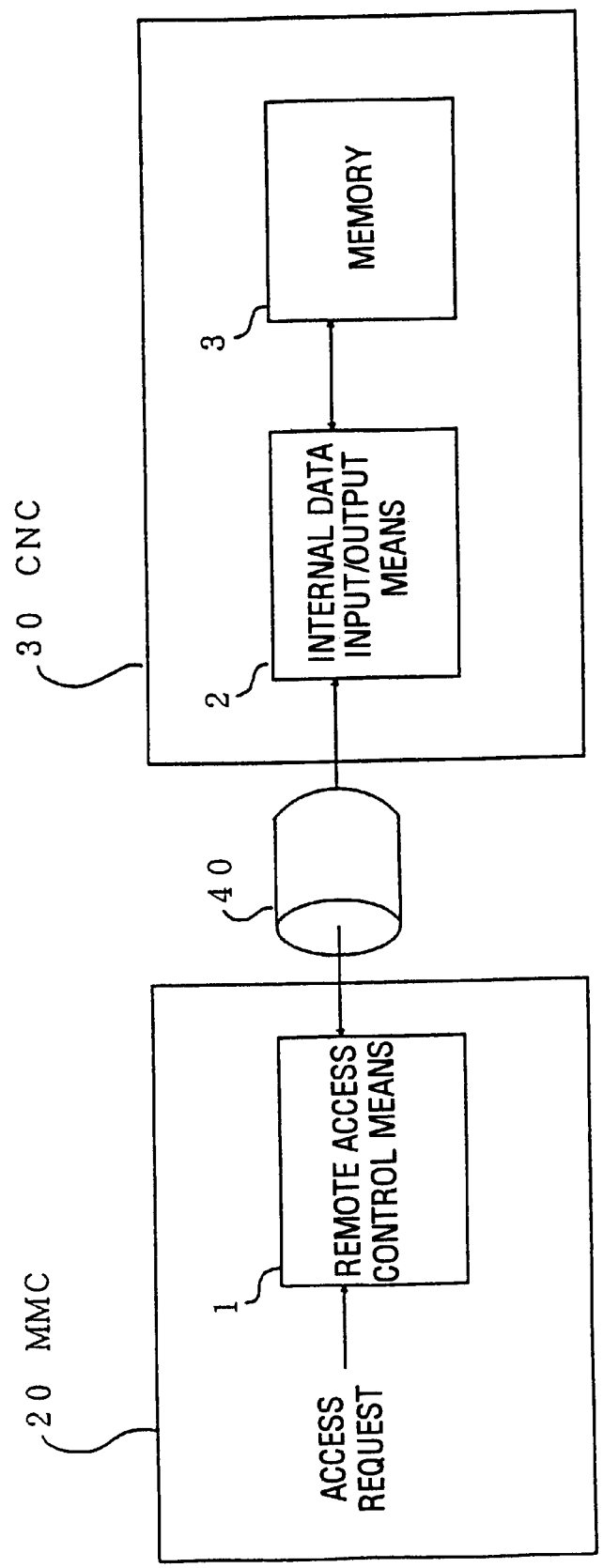
FIG. 1 is a block diagram showing a conceptual view of the present invention.

FIG. 1 is a block diagram showing a conceptual view of the present invention. FIG. 1 shows that a man-machine interface controller (MMC) 20 and a numerical controller (CNC) 30 are interconnected by a transmission line 40. When an access request to a memory 3 in the CNC 30 is issued by a certain device in the MMC 20, remote access control unit 1 outputs the access request to the CNC 30. The case of a write-request, the access request contains write-data and address information to indicate where in the memory 3 the data should be written. In case of a read-request, the access request contains address information to indicate where in the memory 3 should be read.

Upon reception of such an access request, an internal data input/output unit 2 in the CNC 30 makes access to the requested address by performing a direct memory access (DMA) to the memory 3 without any help of the processor in the CNC 30. It writes the data to the memory when the access request is a write-request. On the other hand, when the access request is a read-request, the internal data input/output unit 2 outputs the requested data to the MMC 20, and the remote access control unit 1 in the MMC 20 receives the data and forwards it to the device which issued the access request.

As described above, the MMC 20 directly makes access to the memory 3 without any intermediate process by the processor in the CNC 30.

Figure 2:
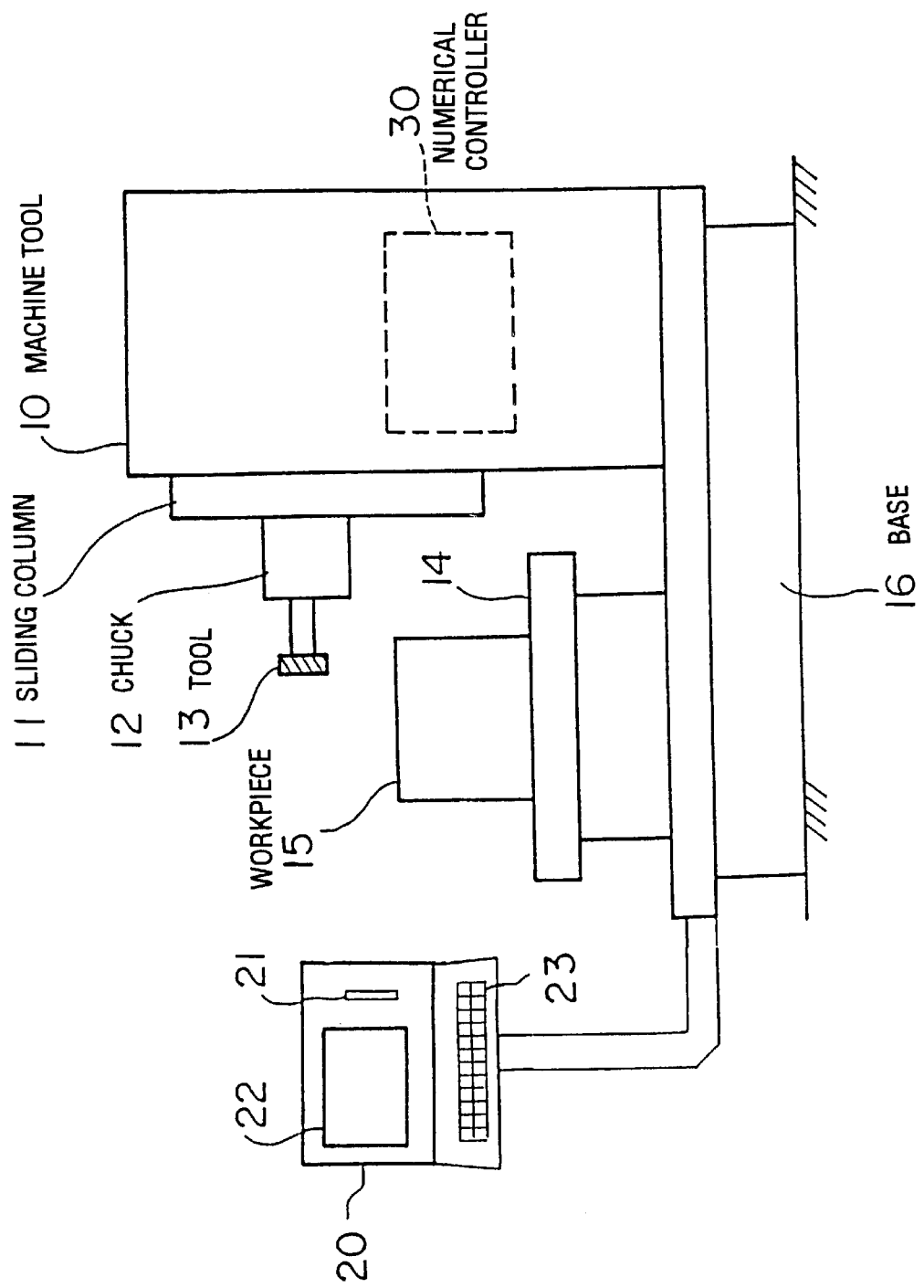
FIG. 2 is a total schematic diagram showing a numerical control system according to the present invention.

FIG. 2 is a schematic diagram showing a numerical control system according to the present invention. This numerical control system is roughly divided into three constituents: a machine tool 10, a numerical controller 30 integrated in the machine tool 10, and an MMC 20 for remote operations.

The machine tool 10 is equipped with a sliding column 11 on its one side. A spindle motor of the machine tool 10 rotates a tool 13 grasped by a chuck 12 and a Z-axis servo motor slides the tool 13 up and down (in Z-axis direction). A table 14 can slide back and forth (in X-axis direction) and also from side to side (in Y-axis direction). A workpiece 15 is mounted on this table 14 for machining. The machine tool 10 and the table 14 are both mounted on a base 16.

The operator gives operation commands to the numerical controller 30 via the MMC 20, which is remotely located from the machine tool 10. This MMC 20 has a keyboard 23, a display unit 22, and a floppy disk drive 21, which are controlled by a processor integrated therein. The keyboard 23 is composed of cursor keys, geometrical-element keys, numeric keys and the like, which are used for entering necessary geometry data, machining data, etc. Software for generating part programs can be installed via the floppy disk drive 21. The display unit 22, which is actually a CRT or a liquid crystal display, shows part geometries, machining conditions and the like when the operator interactively creates a part program. The part program finally generated in the MMC 20 will be transferred to the numerical controller 30.

In addition to the above, when it become necessary to have some data in the numerical controller 30, the MMC 20 can get the data by making a direct access to the memory in the numerical controller 30.

The above-described structural arrangement allows the operator to create a part program with the MMC 20 and transfer it to the numerical controller 30. It also allows the numerical controller 30 to perform the desired machining operations, causing tool 13 to engage the workpiece 15 by controlling the sliding column 11 and table 14 of the machine tool 10.

Figure 3:
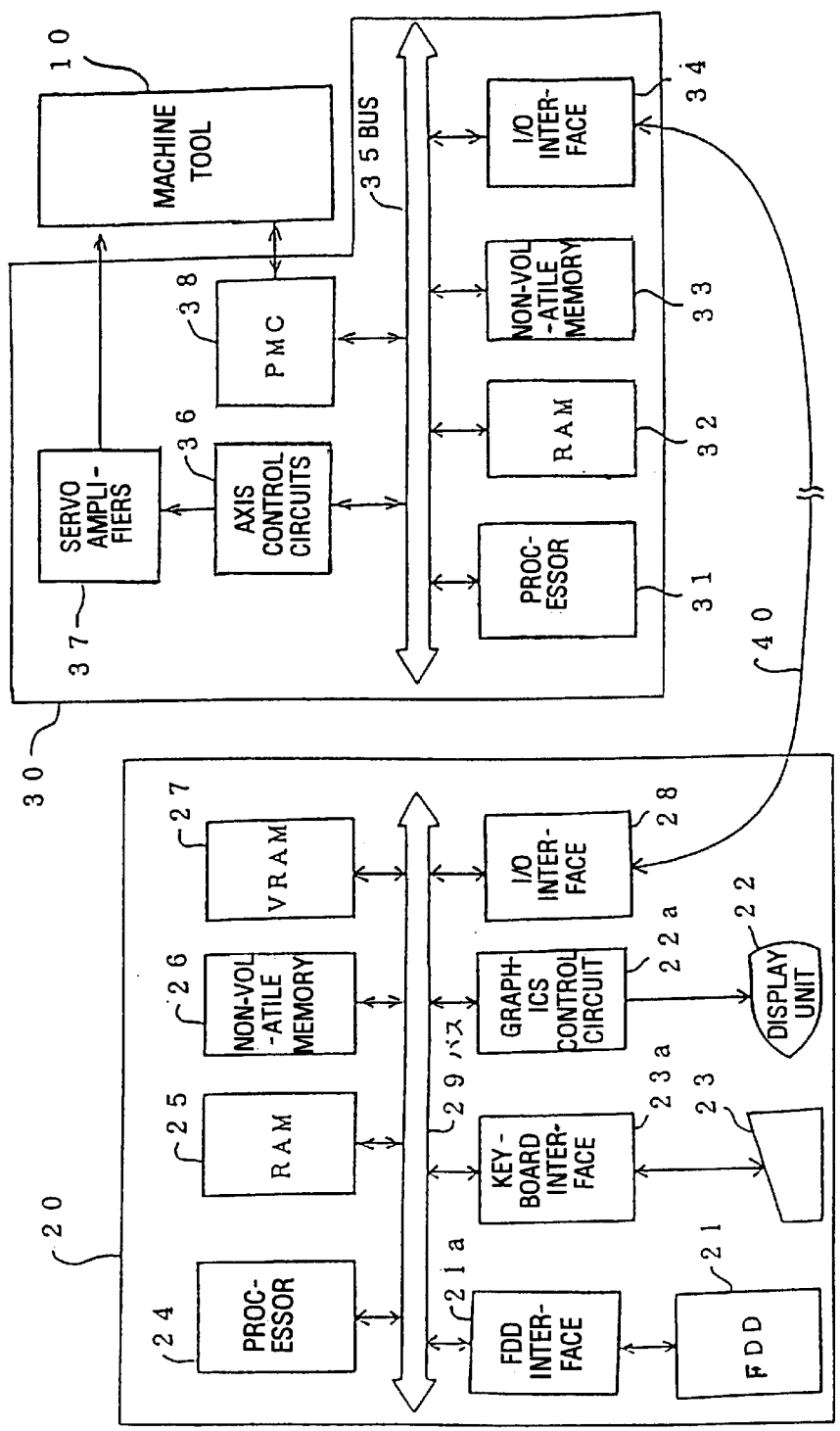
FIG. 3 is a block diagram showing the structure of a numerical control system according to the present invention.

FIG. 3 is a block diagram showing the structure of the numerical control system according to the present invention. This figure can be roughly divided into two parts, namely, the MMC 20 and the CNC 30. While a processor 31 controls various devices on a bus 35 in the CNC 30, a processor 24 controls various devices on a bus 29 in the MMC 20. The MMC 20 and the CNC 30 are interconnected by a transmission line 40, which serves as a medium of data communications. Note that the bus 35 in the CNC 30 is a multi-master bus which permits some devices other than the processor 31 to become a bus master.

The CNC 30 is under the total control of the processor 31. A RAM 32 stores various data or I/O signals. A non-volatile memory 33 is organized by some CMOS memory devices backed up by batteries, where system parameters, pitch error compensation data, tool offset data and the like are retained even after the main power is lost.

Axis control circuits 36 receive axis motion commands from the processor 31 and output the commands to servo amplifiers 37. The servo amplifiers 37, in response to those motion commands, drive servo motors integrated in the machine tool 10. A programmable machine controller (PMC) 38 receives control signals such as T-function (Tool selection command) signals at the time of execution of the part programs. The PMC 38 processes those control signals according to its sequence program and produces operation command signals, thereby controlling the machine tool 10. The PMC 38 also receives status signals from the machine tool 10 and provides input signals to the processor 31 after processing them with the sequence program.

Further, an I/O interface 34 on the bus 35 is in charge of data communication with the MMC 20. In response to an access request from the MMC 20 targeting the RAM 32, the I/O interface 34 makes a direct memory access (DMA) to read or write data in the RAM 32. When the access request is a read-request, the I/O interface 34 sends the read data to the MMC 20. On the other hand, when the access request is a write-request, it writes the received data into the RAM 32. The I/O interface 34 also performs data conversion from parallel to serial when outputting data on the bus 35 to the MMC 20, and from serial to parallel when receiving the inbound signals from the MMC 20.

The MMC 20 executes interactive processing programs invoking some interactive data input screens, where the operator can set various machining operations and data using a menu provided therein. The processor 24 displays such menu-style input screens on a display unit 22 via a graphics control circuit 22a, and according to the data thereby entered, it generates part programs as well as displaying total tool paths in a background animation. Various data required for this interactive processing are stored in a RAM 25. Composed of battery-backed CMOS memory devices, a non-volatile memory 26 is provided for storing application programs, part programs and the like which must be retained even when the main power is removed. A video RAM (VRAM) 27 works as a high-speed RAM to store graphics data for animation which will simulate a machining process of the machine tool 10 according to the part programs which have been compiled as NC program statements and stored in the non-volatile memory 26. The graphics control circuit 22a converts the graphics data in the VRAM 27 into video signals and outputs them to the display unit 22.

For data exchange purposes such as loading software or saving various data, there is provided a floppy disk drive 21 with an FDD interface 21a to read and write floppy disks.

The graphics control circuit 22a converts digital information produced by the processor 24 and the like into the video signals and provides them to the display unit 22. CRT or liquid crystal display is a suitable device for the display unit 22. A keyboard interface 23a supports data transfer control between the keyboard 23 and the processor 24. The keyboard 23 consists of symbol keys, numeric keys and the like for entering geometry data and NC data necessary for the machine operations.

The I/O interface 28, in response to an access request from a certain device in the MMC 20 targeting the RAM 32 in the CNC 30, converts the parallel access request into serial signals and sends them to the CNC 30. It also receives the serial signals sent from the CNC 30 converting them into parallel signals.

The transmission line 40, which connects between the I/O interface 28 in the MMC 20 and the I/O interface 34 in the CNC 30, can be 20 to 50 meters long as well as allowing a high-speed data transmission at about 25 Mbps.

Figure 4:
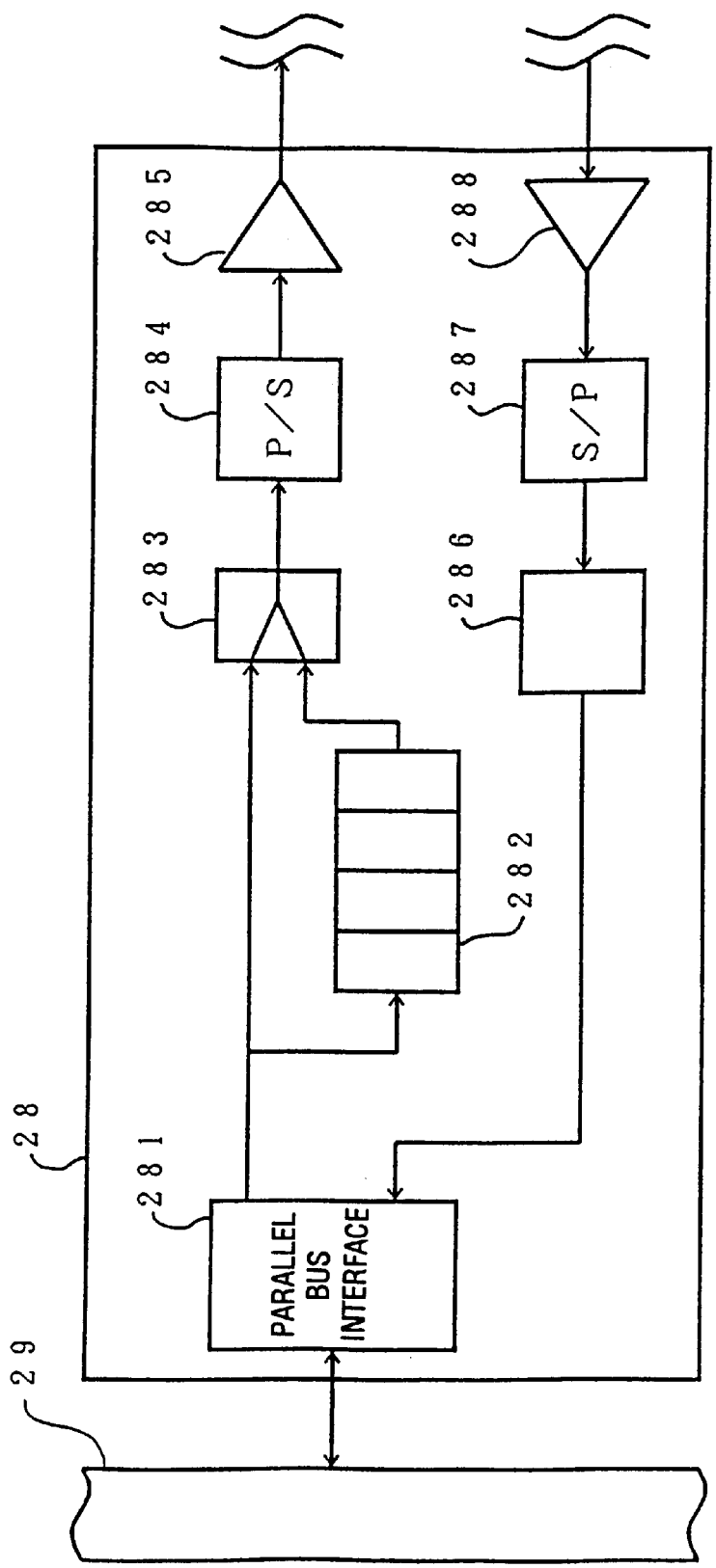
FIG. 4 is a circuit diagram of an I/O interface in the MMC of the present invention.

FIG. 4 is a circuit diagram of the I/O interface 28 in the MMC 20. The access request signal which has reached the I/O interface 28 via the bus 29 is accepted by a parallel bus interface 281. When the access request is a read-request, its signal is applied to a selector 283. When it is a write request, the data is written into a write buffer 282, which can store a plurality of data and outputs the data in the first-in-first-out manner. The output of the write buffer 282 is supplied to the selector 283. The selector 283 receives a read-request or a write-request and then simply outputs the access request to the next stage. When it has received both requests at a time, the selector 283 will output the read-request before the write-request. A parallel-to-serial converter (P/S) 284 converts the parallel input signal into a serial output signal. A driver 285 amplifies this output signal for sending it to the CNC 30.

An incoming signal from the CNC 30 is supplied to the serial-to-parallel converter (S/P) 287 via a receiver 288, where the signal is converted from serial to parallel. After passing through an error check circuit 286 for inspection of its data integrity, the parallel output signal reaches the parallel bus interface 281, which outputs the signal to the bus 29.

The following is an explanation of the procedure in which the MMC processor accesses the CNC's RAM in the above-described numerical control system. For ease of explanation, the procedure is divided into the following three processes: the transmission process of an access request from the MMC to the CNC, the process involving CNC reception of the access request to delivery of the requested data to the MMC, and the process of the MMC from reception of the data to transmission of the data to MMC processor.

Figure 5:
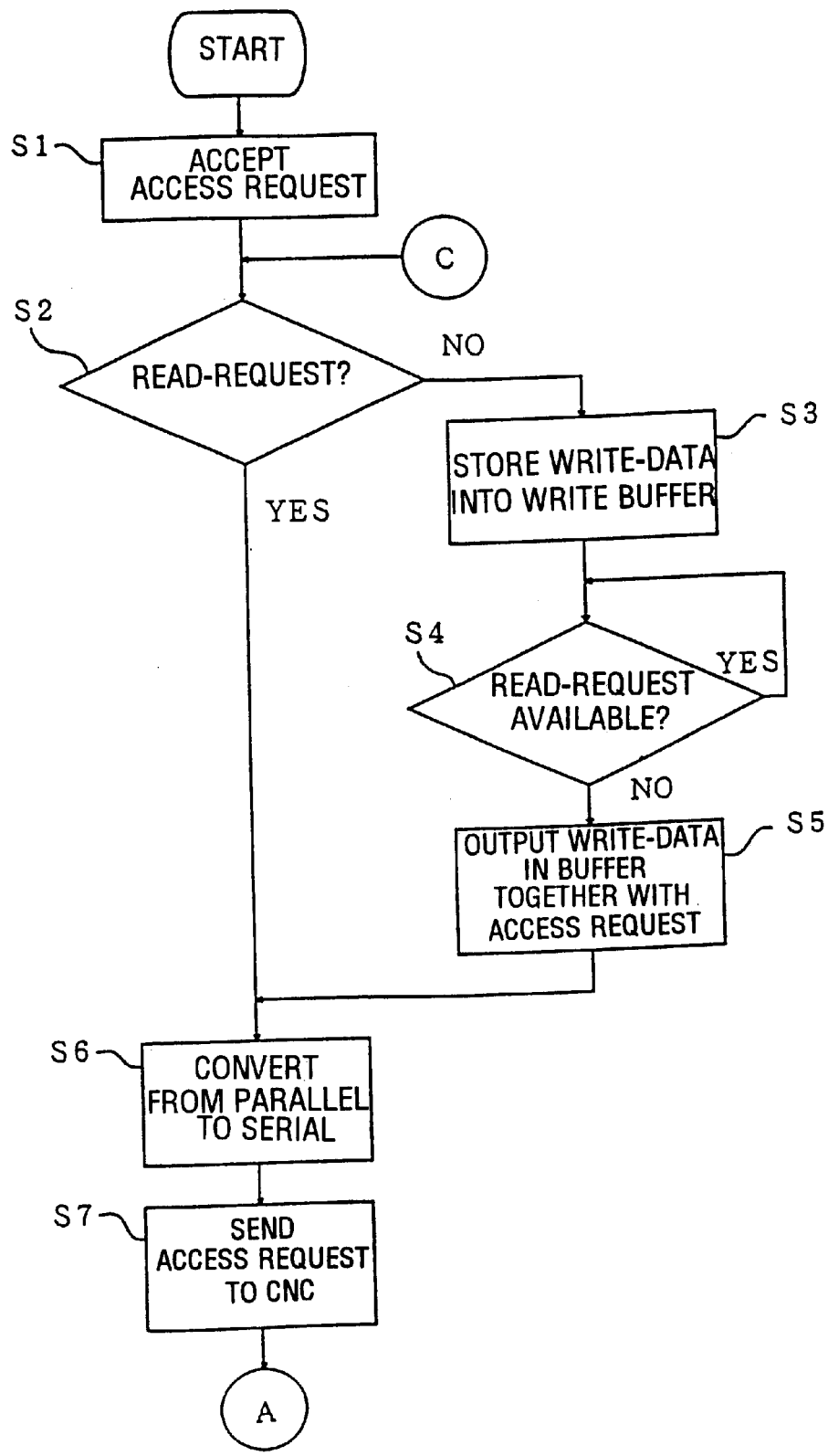
FIG. 5 is a flowchart showing a process of the MMC for sending an access request in the present invention.

FIG. 5 is a flowchart showing the process of the MMC to transmit an access request. Note that it is the remote access control means 1 previously described in FIG. 1 that performs the detailed process steps shown in this flowchart.

Step S1 The remote access control unit 1 accepts an access request which has come from the processor via the bus 29 requesting an access to the RAM 32 in the CNC (see FIG. 3).

Step S2 It is determined whether the access request is a read-request. If it is, the procedure goes to step S6. Otherwise, the access request is taken as a write-request and the procedure goes to step S3 for data writing.

Step S3 The write-data is stored in the write buffer.

Step S4—Checking occurs to determine if a read-request has occurred. If it has, the procedure repeats step S4. If there is no read-request, the procedure proceeds to step S5. Since the MMC processor has nothing to do but wait until the data becomes ready to read after sending the read-request, it is desirable to fetch the data as quickly as possible. This is the reason a read-request is given priority over a write-request.

Step S5 The remote access control unit 1 outputs the write-data in the buffer together with the access request (i.e., the write-request).

Step S6 The access request signals, which contain the write-data in case of a write-request, are converted from parallel to serial format.

Step S7 The remote access control unit 1 sends out the access request to the CNC. (The procedure continues to "A" in FIG. 6.)

The access request produced by the processor in the MMC is thereby transmitted to the CNC.

Figure 6:
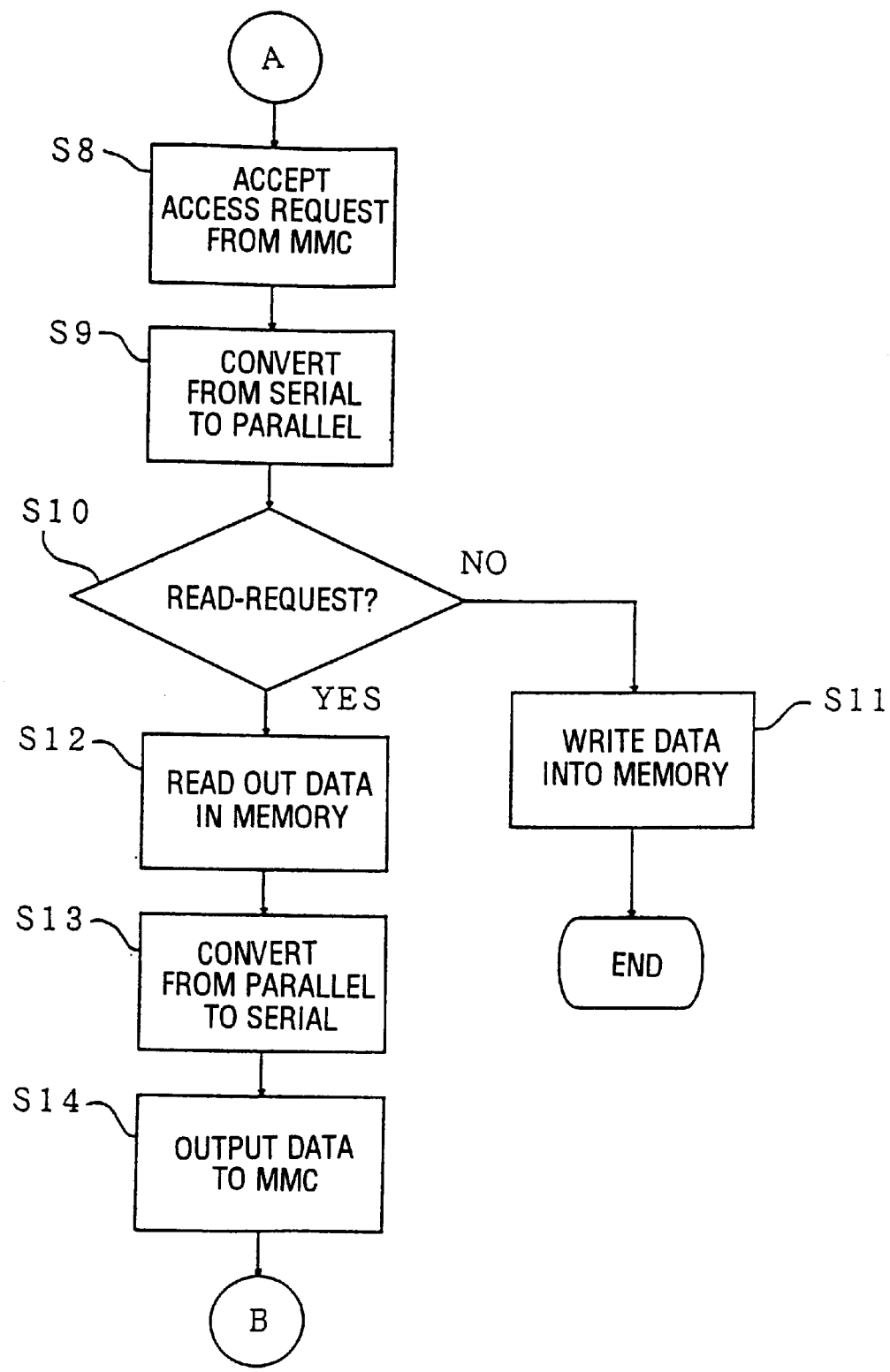
FIG. 6 is a flowchart showing a process of the CNC from reception of the access request to delivery of the requested data to the MMC of the present invention.

FIG. 6 is a flowchart showing the process of the CNC from reception of the access request to delivery of the requested data to the MMC. Note that it is the internal data input/output unit 2 previously described in FIG. 1 that performs the detailed process steps shown in this flowchart.

Step S8 The internal data input/output unit 2 accepts the access request transferred from the MMC.

Step S9 The access request signals are converted from serial to parallel.

Step S10 It is determined if the access request is a read-request. If it is, the procedure goes to step S12. Otherwise, the procedure goes to step S11.

Step S11 The data contained in the access request is written into the RAM and the procedure is terminated here. Note that the access to the RAM is performed by unit of DMA without intervention of the CNC processor.

Step S12 The internal data input/output unit 2 reads out the data from the RAM specified by the access request. This access to the RAM is also performed by DMA.

Step S13 The output data signals are converted from parallel to serial.

Step S14 The internal data input/output unit 2 transmits the output data to the MMC. (The procedure continues to "B" in FIG. 7.)

In the way described above, the internal data input/output unit 2 directly writes data when the access request is a write-request. When it is a read-request, the internal data input/output unit 2 directly fetches the data and transfers it to the MMC.

Figure 7:
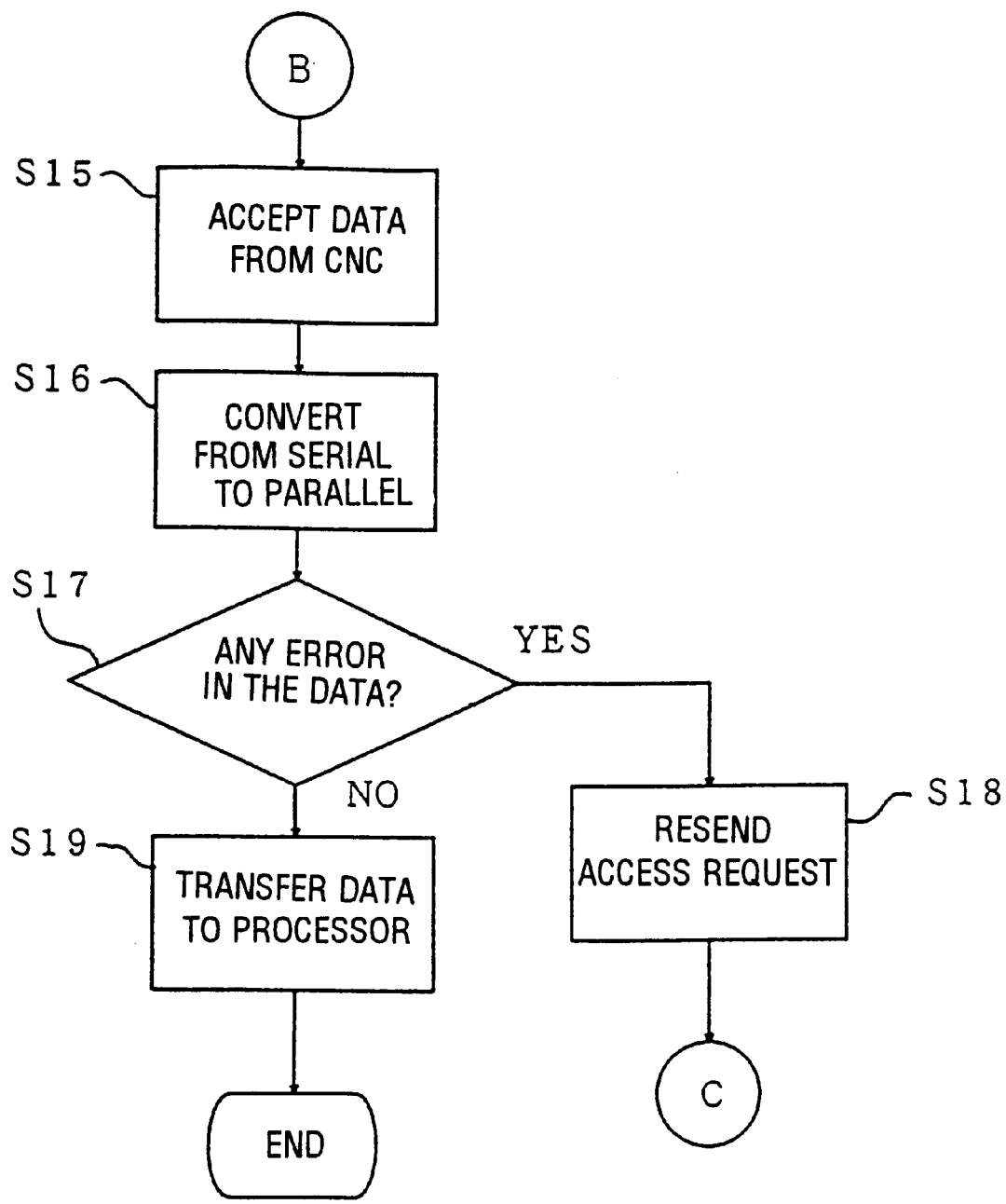
FIG. 7 is a flowchart showing a process of the MMC from reception of the data to transfer of the data to the MMC processor of the present invention.

FIG. 7 is a flowchart showing a process of the MMC from reception of the data to transmission of the data to MMC processor. It is the remote access control unit 1 previously described in FIG. 1 that performs the detailed process steps shown in this flowchart.

Step S15 The remote access control unit 1 accepts the data transferred from the CNC.

Step S16 The data signals are converted from serial to parallel.

Step S17 Through the error check a determination is made whether data integrity has been maintained during transmission. If any error is found, the procedure goes to step S18, and if not, to step S19.

Step S18 The remote access control unit 1 resends the access request and the procedure goes back to step S2.

Step S19 The remote access control unit 1 transfers the data to the processor in the MMC. (The procedure goes to "A" in FIG. 5.)

This concludes the whole procedure for the access request issued by the MMC processor to make access to the RAM in the CNC.

As described above, the access request sent from the MMC to the CNC is handled by the internal data input/output unit 2 which makes a direct access to the memory without intervention of the processor in the CNC. Thanks to this configuration, the processor in the MMC can have access directly to the CNC in the same way as access to the memory of its own. Besides allowing a high-speed access from the MMC to the CNC, the present invention avoids any extra work by the CNC processor regarding the access, which results in a great throughput of the total numerical control system.

In addition to the above, since the present invention connects the MMC and CNC with a high-speed data communications system whose transmission line is so extendible that MMC can be located at a distance from the CNC, thereby enabling the operator to check some data on the display screen or operate the keyboard in any place convenient for his/her work. Further, in addition to the aforementioned floppy disk drive, other peripheral devices such as a printer can be connected to the MMC. The present invention makes it possible to set those devices necessary for the operator at a convenient place for his/her work.

Incidentally, the above-described embodiment has shown a numerical controller for an example of the FA controllers, however, it is possible to apply the present invention to other controllers if they have a multi-master bus. A robot controller, for example, is included in such FA controllers, and in this application, the operator can carry out his/her task outside the working area of the robot, thereby keeping the operator's safety.

As for the interactive data processing unit, the above description uses an MMC, however, it is also possible to apply the present invention to any unit having a processor. Thus, a general-purpose personal computer, for example, can serve as the interactive data processing unit, and in that case, it is possible to use a variety of peripheral units (e.g., a hard disk drive and printer) for personal computers at a distance from the FA control unit.

The interactive data processing unit includes a teaching pendant for robot. This teaching pendant is used for on-line programming of the robot motion by manually operating the robot. By applying the present invention to the teaching pendant, the operator can manipulate the robot from a distance.

For further variations, if both the FA control unit and interactive data processing unit are equipped with the remote access control unit and internal data input/output means, the FA control unit will have direct access to the memory in the interactive data processing unit.

The above long discussion will be summarized as follows. According to the present invention, the remote access control unit performs a long-distance transfer of the access request from the interactive data processing unit to the memory within the FA control unit, and the internal data input/output unit in the FA control unit makes a direct access to the memory. Thanks to this configuration the interactive data processing unit, even if it is placed away from the FA control unit, can have access directly to the memory within the FA control unit at a high speed in spite of the long distance.

What is claimed is:

1. A control system having a man-machine interface controller and a numerical controller, and interactively performing data input/output operations therebetween, the control system comprising:

an interactive data processing unit comprising a remote access control unit, disposed within the man-machine interface controller, transmitting an access request to a serial transmission line and receiving data coming via the serial transmission line; and a control unit, disposed within the numerical controller and connected to said interactive data processing unit via the serial transmission line, said control unit comprising a memory, a numerical controller processor, and an internal data input/output unit directly accessing the memory in response to the access request input via the serial transmission line, writing write-data for controlling servo amplifiers of a machine tool into the memory, and transmitting read-data read from the memory to the serial transmission line in response to the access request, said access request accessing an arbitrary address of the memory in said control unit without intervention by the numerical controller processor.

2. The control system according to claim 1, further comprising:

a first parallel/serial converter, disposed within the man-machine interface, and converting an outgoing signal from parallel to serial; and a second parallel/serial converter, disposed within the numerical controller, and converting an incoming signal from serial to parallel, such that the man-machine controller and the numerical controller communicate at a remote distance via serial communication.

3. The control system according to claim 1, further comprising:

further remote access control unit, provided in said control unit, for transmitting an access request to said transmission line and receiving data coming via said transmission line, wherein the access request requests an access to an arbitrary address of a further memory in said interactive data processing unit; and further internal data input/output unit, provided in said interactive data processing unit, for making a direct access to said further memory in said interactive data processing unit in response to the access request inputted via said transmission line, writing further write-data supplied thereto into said further memory, and transmitting further read-data read out from said further memory to said transmission line.

4. The control system according to claim 1, wherein said man-machine interface controller is a robot controller.

5. The control system according to claim 1, wherein said interactive data processing unit is a personal computer.

6. The control system according to claim 1, wherein said memory is a random access memory (RAM).

7. The control system according to claim 1, wherein said interactive data processing unit is a teaching pendant for a robot.

8. A control system comprising:

a remote access control unit, disposed within a man-machine interface controller, remotely transmitting an access request over a serial transmission line and receiving data from the serial transmission line, wherein the access request requests access to an arbitrary address of a memory in a remote numerical controller; and an internal data input/output unit, disposed within the numerical controller and directly accessing the memory in response to the access request input by said remote access control unit, writing write-data for controlling servo amplifiers of a machine tool into said memory, and transmitting read-data read out from the memory to said remote access control unit over the serial transmission line.

9. A method of controlling memory access between a man-machine interface controller and a numerical controller, comprising:

transmitting an access request for data contained in an arbitrary memory address of the numerical controller over a serial transmission line using a remote access control unit contained in the man-machine interface controller;

directly accessing the arbitrary memory address in the numerical controller using a single internal data input/output unit disposed within said numerical controller in response to the transmitted access request;

writing data supplied to the arbitrary memory address from the serial transmission line for controlling servo amplifiers of a machine tool; and transmitting data read from the arbitrary memory address to the man-machine interface over the serial transmission line said single internal input/output unit remotely communicating to said remote access unit in said data processing unit and directly accessing the arbitrary memory address in the numerical controller without the intervention of a processor in the numerical controller.

* * * * *

UNITED STATES PATENT AND TRADEMARK OFFICE
CERTIFICATE OF CORRECTION

PATENT NO.     : 6,219,583 B1
DATED          : April 17, 2001
INVENTOR(S)    : Jiro Kinoshita et al.

It is certified that error appears in the above-identified patent and that said Letters Patent is hereby corrected as shown below:

Title page,
Item [75] Inventors, line 2, delete "gun".
Item [56] References Cited, OTHER PUBLICATIONS, line 4, change "a" to -- A --.
Item [57] ABSTRACT, please substitute the following ABSTRACT:
-- An interactive data processing unit is located at a distance from a FA control unit and is capable of direct access to memory in the FA control unit. When an access request to memory in a CNC is used by a device in an MMC, a remote access control unit outputs the access request to the CNC. Upon reception of the access request, an internal data input/output unit in the CNC accesses the requested address by performing a direct memory access (DMA) operation to the memory. The internal input/output unit writes the data into the memory when the access request is a write request. When the access request is a read request, the internal data input/output unit outputs the data to the MMC. The remote access control unit in the MMC receives the data and forwards the data to the device which issued the access request. The MMC makes access directly to the memory in the CNC. --.

Column 1,
Line 16, change "(MMC)M" to -- (MMC)m --.
Line 64, insert -- , -- after "controller", first occurrence.

Column 2,
Line 40, change "access" to -- accesses --.

Column 3,
Line 12, change "The" to -- In the --.

Column 5,
Line 54, change "of the", first occurrence, to -- involving --; and delete [from].

UNITED STATES PATENT AND TRADEMARK OFFICE
CERTIFICATE OF CORRECTION

PATENT NO. : 6,219,583 B1
DATED : April 17, 2001
INVENTOR(S) : Jiro Kinoshita et al.

It is certified that error appears in the above-identified patent and that said Letters Patent is hereby corrected as shown below:

<u>Column 6,</u>
Line 59, insert -- , -- after "check".

<u>Column 8,</u>
Line 35, change "unit" to -- means --.
Line 41, change "unit" to -- means --.

Signed and Sealed this

Second Day of April, 2002

Attest:

JAMES E. ROGAN
*Attesting Officer*    *Director of the United States Patent and Trademark Office*